United States Patent
Jung et al.

(10) Patent No.: US 8,441,165 B2
(45) Date of Patent: May 14, 2013

(54) MOTOR FOR COMPRESSOR AND HERMETIC COMPRESSOR HAVING THE SAME

(75) Inventors: Hae-Ok Jung, Gyeongsangnam-Do (KR); Dong-In Park, Gyeongsangnam-Do (KR); Ki-Seok Sung, Gyeongsangnam-Do (KR); Jae-Hun Lee, Gyeongsangnam-Do (KR); Cheol Kim, Gyeongsangnam-Do (KR); Seong-Hun Seo, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 12/743,906

(22) PCT Filed: Oct. 20, 2008

(86) PCT No.: PCT/KR2008/006201
§ 371 (c)(1), (2), (4) Date: Sep. 8, 2010

(87) PCT Pub. No.: WO2009/066873
PCT Pub. Date: May 28, 2009

(65) Prior Publication Data
US 2010/0329906 A1    Dec. 30, 2010

(30) Foreign Application Priority Data

Nov. 22, 2007 (KR) .......................... 10-2007-0119901
Nov. 23, 2007 (KR) .......................... 10-2007-0120506
Nov. 27, 2007 (KR) .......................... 10-2007-0121739
Nov. 29, 2007 (KR) .......................... 10-2007-0123057
Nov. 30, 2007 (KR) .......................... 10-2007-0123872
Dec. 3, 2007 (KR) .......................... 10-2007-0124607

(51) Int. Cl.
*H02K 1/06* (2006.01)
(52) U.S. Cl.
USPC .......................... 310/216.012; 310/216.069
(58) Field of Classification Search ........... 310/216.012, 310/216.069–216.074, 254.1
See application file for complete search history.

(56) References Cited

U.S. PATENT DOCUMENTS 3,209,992 A    10/1965   Christiansen
3,942,055 A *   3/1976   Hoffmeyer ............. 310/216.111
(Continued)

FOREIGN PATENT DOCUMENTS

JP    06-038422    2/1994
JP    2004-173366   6/2004
(Continued)

OTHER PUBLICATIONS

Chinese Office Action dated May 8, 2012. (200880120572.6).
(Continued)

*Primary Examiner* — Thanh Lam
(74) *Attorney, Agent, or Firm* — KED & Associates LLP (57) ABSTRACT

Disclosed are a motor for a compressor and a hermetic compressor having the same. An aluminum coil cheaper than a copper coil is used in the motor for the compressor, a ratio between the aluminum coil and a stator core is set, and sectional areas of main and sub slot portions of the stator core and the numbers thereof are adjusted to be suitable for usage conditions, whereby fabricating costs of the motor for the compressor and the hermetic compressor can drastically be reduced and efficiencies thereof can be improved.

19 Claims, 9 Drawing Sheets

U.S. PATENT DOCUMENTS

| | | | |
|---|---|---|---|
| 4,241,274 A | 12/1980 | Brammerlo | |
| 6,544,009 B2 * | 4/2003 | Makino et al. | 417/312 |
| 6,882,080 B2 | 4/2005 | Tanaka et al. | |
| 6,930,424 B2 | 8/2005 | Even et al. | |
| 7,081,697 B2 | 7/2006 | Neet | |
| 7,868,509 B2 | 1/2011 | Yoshino et al. | |
| 8,222,788 B2 * | 7/2012 | Rose | 310/195 |
| 2004/0119363 A1 | 6/2004 | Tanaka et al. | |
| 2007/0210668 A1 * | 9/2007 | Yoshino et al. | 310/216 |
| 2008/0012438 A1 | 1/2008 | Hong | |
| 2008/0129132 A1 | 6/2008 | Gwon | |
| 2008/0170952 A1 | 7/2008 | Jung | |
| 2009/0214363 A1 * | 8/2009 | Noh et al. | 417/423.7 |
| 2010/0117477 A1 * | 5/2010 | Yoshino et al. | 310/156.53 |
| 2010/0135830 A1 | 6/2010 | Yasuda et al. | |
| 2010/0247347 A1 * | 9/2010 | Yoshino et al. | 417/410.1 |
| 2010/0295390 A1 | 11/2010 | Rau et al. | |
| 2010/0329906 A1 * | 12/2010 | Jung et al. | 417/410.1 |
| 2010/0329907 A1 * | 12/2010 | Jung et al. | 417/410.1 |
| 2011/0050024 A1 * | 3/2011 | Rose | 310/195 |
| 2011/0081263 A1 * | 4/2011 | Yoshino et al. | 417/410.1 |

FOREIGN PATENT DOCUMENTS

| | | |
|---|---|---|
| JP | 2005-264749 | 9/2005 |
| KR | 10-0698218 | 3/2007 |

OTHER PUBLICATIONS

International Search Report and Written Opinion dated Sep. 14, 2010 (Application No. PCT/KR2008/006202).

International Search Report and Written Opinion dated Sep. 14, 2010 (Application No. PCT/KR 2008/006203).

International Search Report and Written Opinion dated Sep. 13, 2010. (Application No. PCT/KR2008/006201).

U.S. Office Action issued in U.S. Appl. No. 12/743,936 dated Oct. 23, 2012.

U.S. Notice of Allowance issued in U.S. Appl. No. 12/743,917 dated Nov. 13, 2012.

Chinese Office action dated Jan. 23, 2013. (with translation).

"Emergency Stop Operation of a Small hydro-generator"; Zhao Qing'an et al.; He'nan Science and Technology, vol. 10; Oct. 31, 2004.

* cited by examiner

|  | Cu | AL | | |
| --- | --- | --- | --- | --- |
|  |  | TEST 1 | TEST 2 | TEST 3 |
| DIAMETER OF COIL(d) (mm) | 0.40 | 0.40 | 0.50 | 0.50 |
| INTER-POLE GAP(A) (mm) | 1.73 | 1.73 | 1.73 | 1.50 |
| RATIO d/A |  | 0.23 | 0.29 | 0.33 |
| EFFICIENCY | 70.1% | 64.1% | 69.7% | 70.2% |

FIG. 6

|  | Cu | AL | | |
| --- | --- | --- | --- | --- |
|  |  | TEST 1 | TEST 2 | TEST 3 |
| DIAMETER OF COIL(d) (mm) | 0.40 | 0.40 | 0.50 | 0.50 |
| INTER-POLE GAP(A) (mm) | 2.10 | 2.10 | 2.10 | 1.73 |
| RATIO d/A |  | 0.19 | 0.24 | 0.29 |
| EFFICIENCY | 66.8% | 60.6% | 66.5% | 67.5% |

FIG. 7

|  | Cu | AL | | |
| --- | --- | --- | --- | --- |
|  |  | TEST 1 | TEST 2 | TEST 3 |
| DIAMETER OF COIL(d) (mm) | 0.40 | 0.40 | 0.50 | 0.50 |
| INTER-POLE GAP(A) (mm) | 2.00 | 2.00 | 2.00 | 1.80 |
| RATIO d/A |  | 0.20 | 0.25 | 0.28 |
| EFFICIENCY | 72.0% | 65.7% | 71.6% | 72.3% |

FIG. 8

|  | TEST 1 | TEST 2 | TEST 3 |
| --- | --- | --- | --- |
| WIDTH OF TOOTH PORTION (B) | 4.00 | 3.90 | 3.80 |
| CURVATURE OF SLOT PORTION (R) | 3.46 | 3.54 | 3.60 |
| RATIO (B/R) | 1.15 | 1.10 | 1.05 |
| MOTOR EFFICIENCY | 60.3 | 65.5 | 69.6 |

MOTOR FOR COMPRESSOR AND HERMETIC COMPRESSOR HAVING THE SAME

TECHNICAL FIELD

The present invention relates to a motor for a compressor and a hermetic compressor having the same.

BACKGROUND ART

In general, a refrigerator or an air conditioner, as small-sized home alliances, is provided with a compressor for compressing a refrigerant. A representative motor for the compressor which drives the compressor is a well-known induction motor. The induction motor includes a stator on which a coil is wound, a rotor having conductors in the form of a squirrel cage and rotatably inserted inside of the stator, and a rotational shaft press-fitted in the center of the is rotor for carrying a rotational force, generated by an interaction between a rotation magnetic field generated by an alternating current (AC) flowing in the coil of the stator and an induction current generated by the rotor, to a compression unit of the compressor.

Each of the stator and rotor is configured such that plural sheets of thin stator core are stacked together to be welded. The stator core of the stator includes a yoke portion formed in an approximately annular shape and implementing a moving path of magnetism, a plurality of tooth portions protruded from an inner circumferential surface of the yoke portion with a certain gap and having the coil wound therearound, and a slot portion recessed between the tooth portions so as to allow the coil wound around the tooth portions to be inserted therein.

The coil is widely implemented using copper (Cu) having high conductivity. The conductivity indicates how well a current flows in a material. However, it cannot be said that high conductivity always means many number of electrons flowing. The number of electrons is in proportion to a current. Accordingly, if conductivity is low but the current is the same, it can be said that the number of electrons are the same. However, with respect to the same current, the higher conductivity can lower heat loss occurred in the material itself. A well-known material having the highest conductivity is argentums (Ag), but such Ag is expensive. Thus, copper requiring a relatively low price and having high conductivity is used for the motor for the compressor.

However, a demand of a compressor which has various functions and low price is increased as a technique for the compressor is greatly improved as well as the long history of its development. In spite of this trend, for the coil which occupies a great portion of a fabricating cost for the motor for the compressor, because it greatly influences the efficiency of the motor, a material having the high conductivity such as the copper is still used in spite of the burden of its cost.

DISCLOSURE

Technical Solution

In order to solve the problem of the motor for the compressor according to the related art, an object of the present invention is to provide a motor for a compressor capable of employing a material requiring lower price than copper for a coil and also maintaining a particular level of motor efficiency, and a hermetic compressor having the same.

To achieve the object of the present invention, in one aspect of the present invention, there is provided a motor for a compressor including: a stator provided with a yoke portion formed in an annular shape to configure a passage through which magnetism flows, a plurality of tooth portions protruded from an inner circumferential surface of the yoke portion toward a center thereof by a certain length in a circumferential direction, and a plurality of slot portions recessed between the tooth portions as deep as configuring a certain sectional area in a circumferential direction; coils wound on the slot portions and the tooth portions of the stator, at least some of the coils being formed of aluminum; a rotor inserted in the stator with a certain gap and having conductors therein which is rotated by an electromagnetic induction of the coils; and a rotational shaft press-fitted in the center of the rotor for transferring a rotational force to a compression unit.

In one aspect of the present invention, there is provided a hermetic compressor including: a hermetic case; a driving motor installed in the hermetic case for generating a rotational force; and a compression unit installed in the hermetic case and driven by the driving motor for compressing a refrigerant, wherein a stator of the driving motor is wound with an aluminum coil.

In a motor for a compressor and a hermetic compressor having the same according to the present invention, an aluminum coil cheaper than a copper coil is used in the motor for the compressor, a ratio of the aluminum coil to a stator core is set, and sectional areas of main and sub slot portions of the stator core and the numbers thereof are adjusted to be suitable for usage conditions, whereby fabricating costs of the motor for the compressor and the hermetic compressor can drastically be reduced and efficiencies thereof can be improved.

MODE FOR INVENTION

Hereinafter, detailed description will be given of a motor for a compressor and a hermetic compressor having the same with reference to the accompanying drawings according to the present invention.

Figure 1:
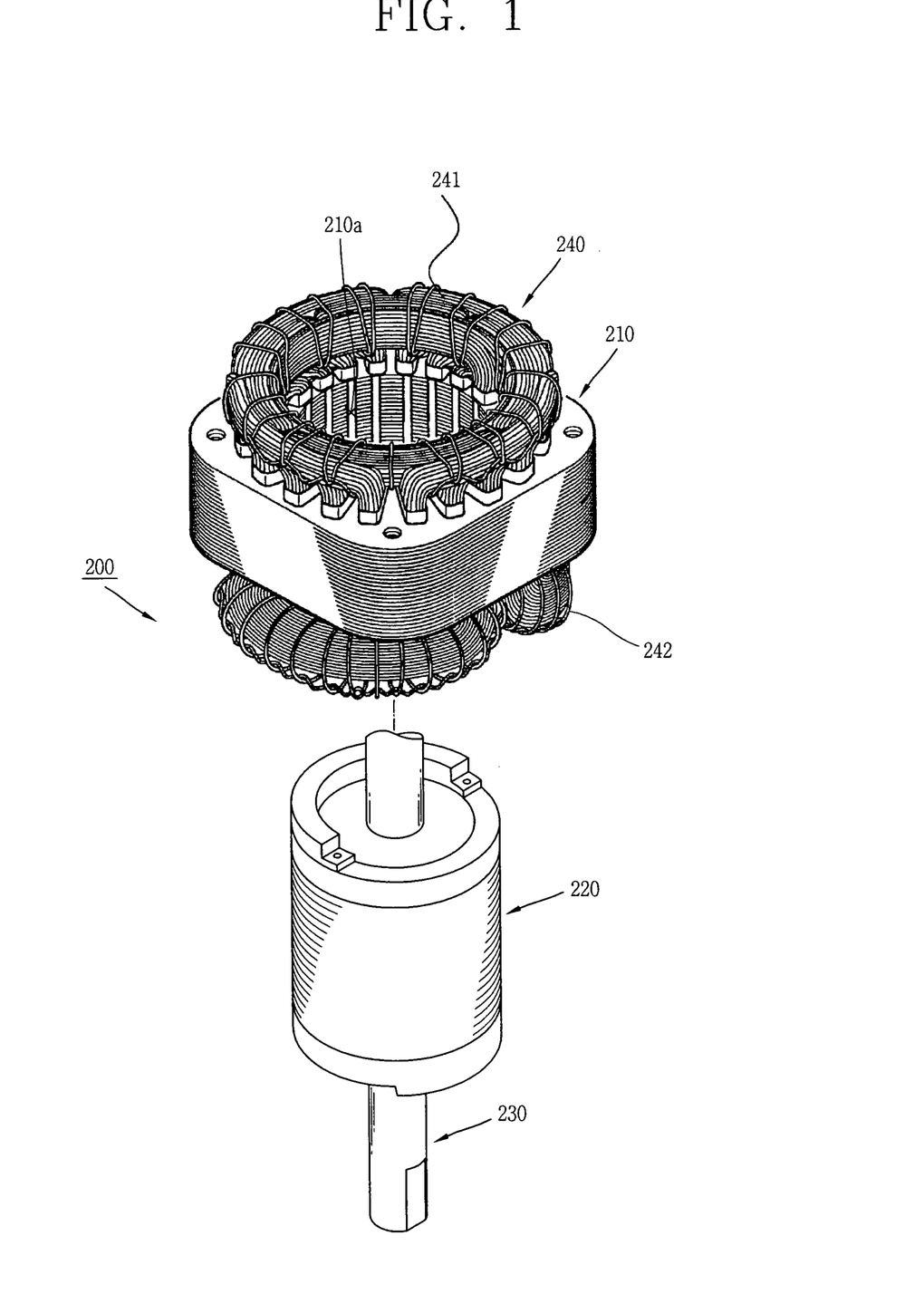
FIG. 1 is a perspective view showing a disassembled motor for a compressor according to the present invention.
Figure 2:
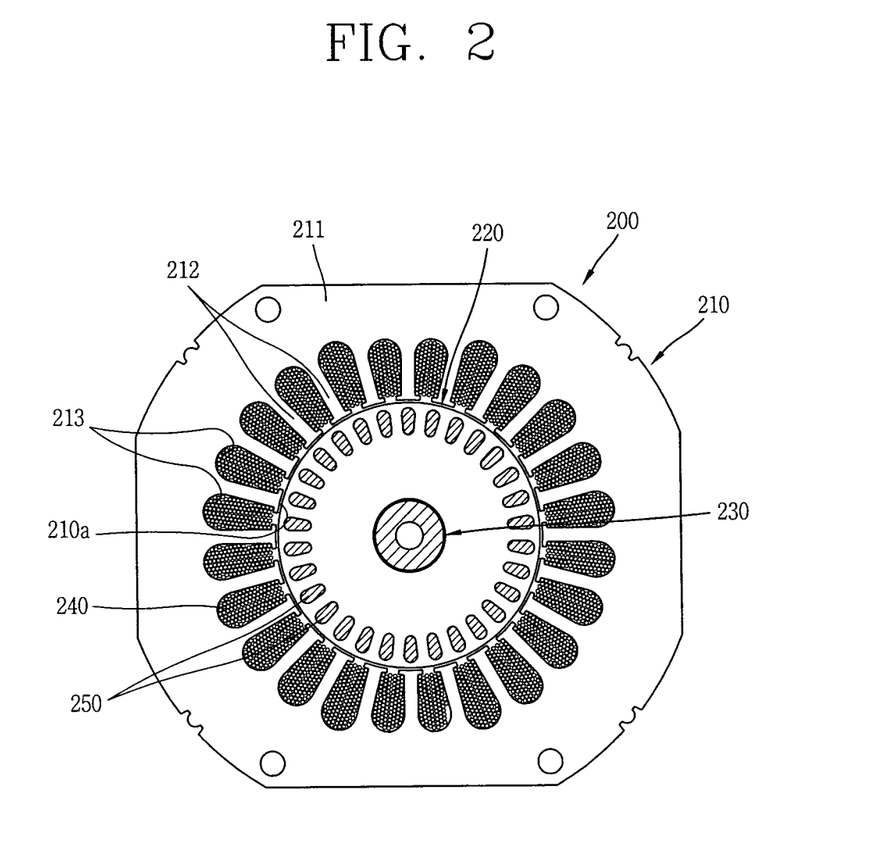
FIG. 2 is a planar view of the motor for the compressor shown in FIG. 1.

As shown in FIGS. 1 and 2, a motor 200 for a compressor according to the present invention may include a stator 210 fixed to a hermetic case of the compressor and having a coil 240 wound thereon, a rotor 220 rotatably inserted inside the stator 210 and having conductors 250 therein, and a rotational shaft 230 press-fitted in the center of the rotor 220 for transferring a rotational force to a compression unit of the compressor.

The stator 210 is formed by axially laminating plural sheets of stator core up to a certain height and welding them together. The plural sheets of stator core form a rotor insertion hole 210a having an outer circumferential surface with an approximately tetragonal shape (or it may be similar to a circular shape) and an inner circumferential surface with an approximately circular shape.

The stator core forms a yoke portion 211 configuring a moving path of magnetism with being connected in an approximately circumferential direction at its periphery. The yoke portion 211 may be integrally formed. Alternatively, the yoke portion 211 may be formed in a form of circular arc, depending on a sheet metal working for the stator core, so as to be coupled each other in a bulgy and hollow combination or be welded together. The yoke portion 211 has great influence on efficiency of the motor 200. The entire available area of the yoke portion 211 may appropriately be determined according to a decision with respect to an inner diameter of the stator 210 and an entire area of a slot portion 213 as will be explained later.

Figure 3:
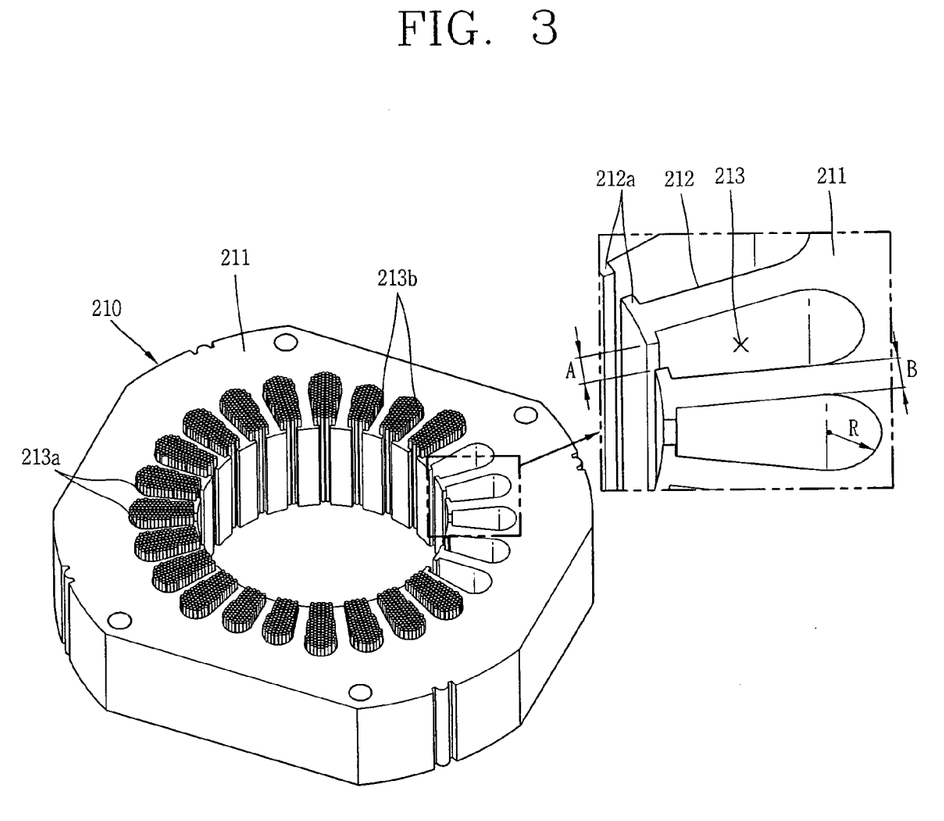
FIG. 3 is a perspective view showing a stator of the motor for the compressor shown in FIG. 1.
Figure 4:
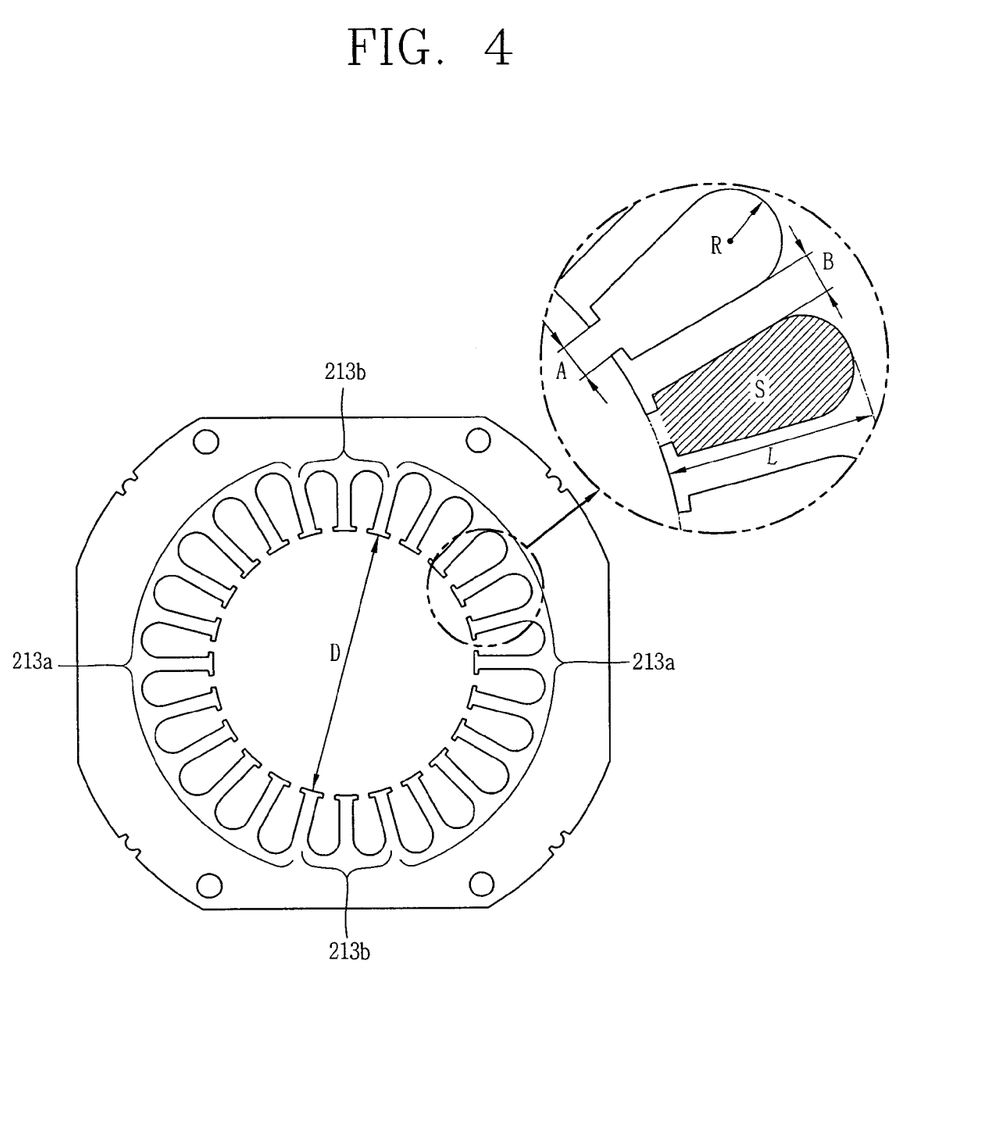
FIG. 4 is a planar view showing the stator for the compressor shown in FIG. 1.

The stator core, as shown in FIGS. 3 and 4, is provided with a plurality of tooth portions 212 formed at a central side and protruded from an inner circumferential surface of the yoke portion 211 in a radial direction with a certain gap therebetween so as to be wound by a coil. The tooth portions 212 are formed with a uniform gap with a slot portion 213 (to be explained later) interposed therebetween. The tooth portions 212 have approximately the same width B in a lengthwise direction. The width B of each tooth portion 212 is formed approximately not to be longer than a length L in its radial direction, although it depends on the capacity of the motor. Outsides of the tooth portions 212 are curvedly connected with a particular curvature R with neighboring tooth portions 212.

A ratio of the width B of each tooth portion 212 to a curvature R between neighboring tooth portions 212, namely, a ratio of the width B of the tooth portion 212 to the curvature R of the slot portion 213 to be explained later is in relation to the efficiency of the motor for the compressor. That is, the motor 200 for the compressor is configured such that the low ratio B/R of the width B of the tooth portion 212 to the curvature R of the slot portion 213 increases the efficiency of is the motor. The ratio B/R is preferably approximately in the range between 1.05 and 1.15.

A ratio D/B of the width B of each tooth portion 212 to the inner diameter D of the stator 210 also relates to efficiency of a motor for a compressor. That is, for the motor 200 for the compressor, preferably, the high ratio of the inner diameter D of the stator 210 to the width B of each tooth portion 212 increases the efficiency of the motor 200, and the ratio D/B is approximately in the range between 13.9 and 15.0.

A pole portion 212a extends from an end of a central side of each tooth portion 212 in a circumferential direction to have a certain gap with neighboring tooth portions 212. The gap A between the pole portion 212a (or an area of an open side of the slot portion) should be formed not to be smaller than at least a diameter d of the coil 240, in order to facilitate a winding work of the coil 240. The gap A between the pole portions 212a (i.e., the inter-pole gap A), which has great influence on the efficiency of the motor may be differently formed according to a material of the coil 240, the diameter d of the coil 240 and the number of slots of the stator 210. For example, when the coil 240 has a diameter of 0.5 mm, preferably, the inter-pole gap A should be shorter than approximately 1.73 mm for a 20-slot stator (i.e., stator having 20 slots), be shorter than approximately 2.10 mm for a 24-slot stator, and be shorter than approximately 2.00 mm for a 28-slot stator.

Figure 5:
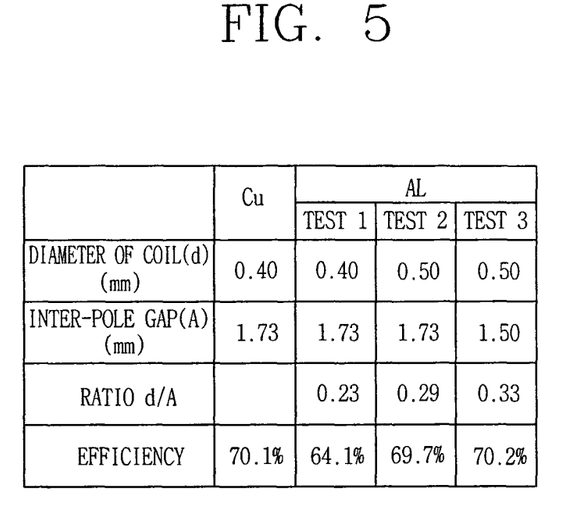
FIG. 5 is a table showing testing results including a ratio between a diameter of a coil and a gap between pole portions (a gap between teeth) and motor efficiency depending on the ratio, in a 20-slot stator of the motor for the compressor shown in FIG. 1.

Here, for the 20-slot stator, the inter-pole gap A, namely, a ratio d/A of the diameter d of the aluminum coil to the inter-pole gap A can preferably be greater than approximately 0.29. That is, as shown in FIG. 5, in case of forming the coil 240 using copper, when the diameter d of the coil 240 is 0.4 mm and the inter-pole gap A is 1.73 mm, the motor 200 for the compressor obtains approximately 70.1% efficiency. On the other hand, in order for an aluminum coil to obtain efficiency as much as that of the motor 200 having the copper coil, it is preferable that the diameter d of the aluminum coil is about 0.5 mm and the inter-pole gap A is about 1.5 mm. It can be noticed that this case (i.e., test 3) shows the compressor efficiency of about 70.2%, which means that the efficiency of the motor employing the aluminum coil can be improved more than that of the motor having the copper coil. In addition, as shown in FIG. 5, even when the diameter d of the aluminum coil is 0.5 mm and the inter-pole gap A is 1.73 mm (i.e., test 2), the efficiency is not very different from employing the copper coil. However, when the diameter d of the aluminum coil is 0.4 mm and the inter-pole gap A is 1.73 mm (i.e., test 1), the efficiency of the compressor motor is drastically decreased, which can be considered as an improper condition.

Figure 6:
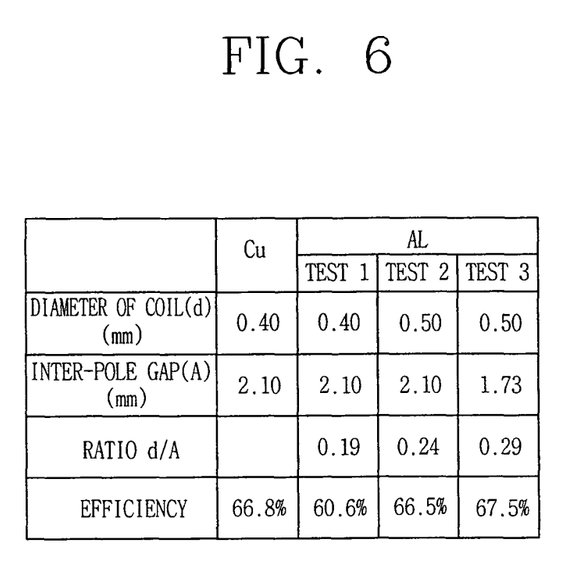
FIG. 6 is a table showing testing results including a ratio between a diameter of a coil and a gap between pole portions (a gap between teeth) and motor efficiency depending on the ratio, in a 24-slot stator of the motor for the compressor shown in FIG. 1.

For the 24-slot stator, it is preferable that the inter-pole gap A (or the area of the open side of the slot portion) is less than about 2.10 mm, in more detail, a ratio d/A of the diameter d of the aluminum coil to the inter-pole interval A is equal to or more than about 0.24. That is, as shown in FIG. 6, for the copper coil, when the diameter d of the coil is 0.4 mm and the inter-pole gap A is 2.10 mm, the efficiency of the motor is increased up to about 66.8%. On the other hand, in order for an aluminum coil to obtain efficiency as much as that of the motor 200 having the copper coil, it is the most preferable that the diameter d of the aluminum coil is 0.5 mm and the inter-pole gap A is 1.73 mm. It can be noticed that this case (i.e., test 3) shows the compressor efficiency of about 67.5%, which means that the efficiency of the motor employing the aluminum coil can be improved more than that of the motor having the copper coil. In addition, as shown in FIG. 5, even when the diameter d of the aluminum coil is 0.5 mm and the inter-pole gap A is 2.10 mm (i.e., test 2), the efficiency is not very different from employing the copper coil. However, when the diameter d of the aluminum coil is 0.4 mm and the inter-pole gap A is 2.10 mm (i.e., test 1), the efficiency of the compressor motor is drastically decreased, which can be considered as an improper condition.

Figure 7:
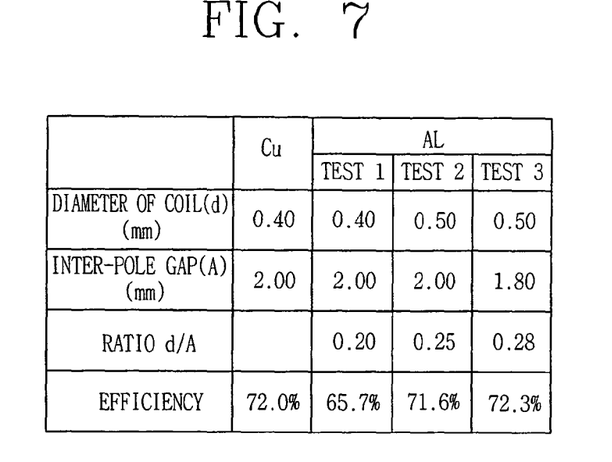
FIG. 7 is a table showing testing results including a ratio between a diameter of a coil and a gap between pole portions (a gap between teeth) and motor efficiency depending on the ratio, in a 28-slot stator of the motor for the compressor shown in FIG. 1.

For the 28-slot stator, it may be preferable that the interpole gap A (or inter-tooth gap) is less than about 2.00 mm, in more detail, the ratio d/A of the diameter d of the aluminum coil to the inter-pole gap A is in the range of about 0.19~0.29, more particularly, more than 0.25. That is, as shown in FIG. 7, in case of the copper coil, when the diameter d of the coil is 0.4 mm and the inter-pole gap A is 2.00 mm, the motor for the compressor has about 72.0% efficiency. On the other hand, in order for an aluminum coil to obtain efficiency as much as that of the motor 200 having the copper coil, it is preferable that the diameter d of the aluminum coil is 0.5 mm and the inter-pole gap A is 1.80 mm. It can be noticed that this case (i.e., test 3) shows the compressor efficiency of about 72.3%, which means that the efficiency of the motor employing the aluminum coil can be improved more than that of the motor having the copper coil. In addition, as shown in FIG. 7, even when the diameter d of the aluminum coil is 0.5 mm and the inter-pole gap A is 2.00 mm (i.e., test 2), about 71.6% efficiency of the motor for the compressor is maintained, and thus it can be noticed that it is not very different from employing the copper coil in their motor efficiencies. However, when the diameter d of the aluminum coil is 0.4 thin and the inter-pole gap A is 2.00 mm (i.e., test 1), the efficiency of the compressor motor is just 65.7%, which means that the efficiency of the motor is drastically decreased rather than that of the copper coil. Hence, this condition is improper.

The stator core, as shown in FIGS. 3 and 4, is provided with a plurality of tooth portions 212 formed at a central side and protruded from an inner circumferential surface of the yoke portion 211 in a radial direction with a certain gap therebetween so as to be wound by a coil. The tooth portions 212 are formed with a uniform gap with a slot portion 213 (to be explained later) interposed therebetween. The tooth portions 212 have approximately the same width B in a lengthwise direction. The width B of each tooth portion 212 is formed approximately not to be longer than a length L in its radial direction although it depends on the capacity of the motor. Outsides of the tooth portions 212 are curvedly connected with a particular curvature R with neighboring tooth portions 212.

Figure 8:
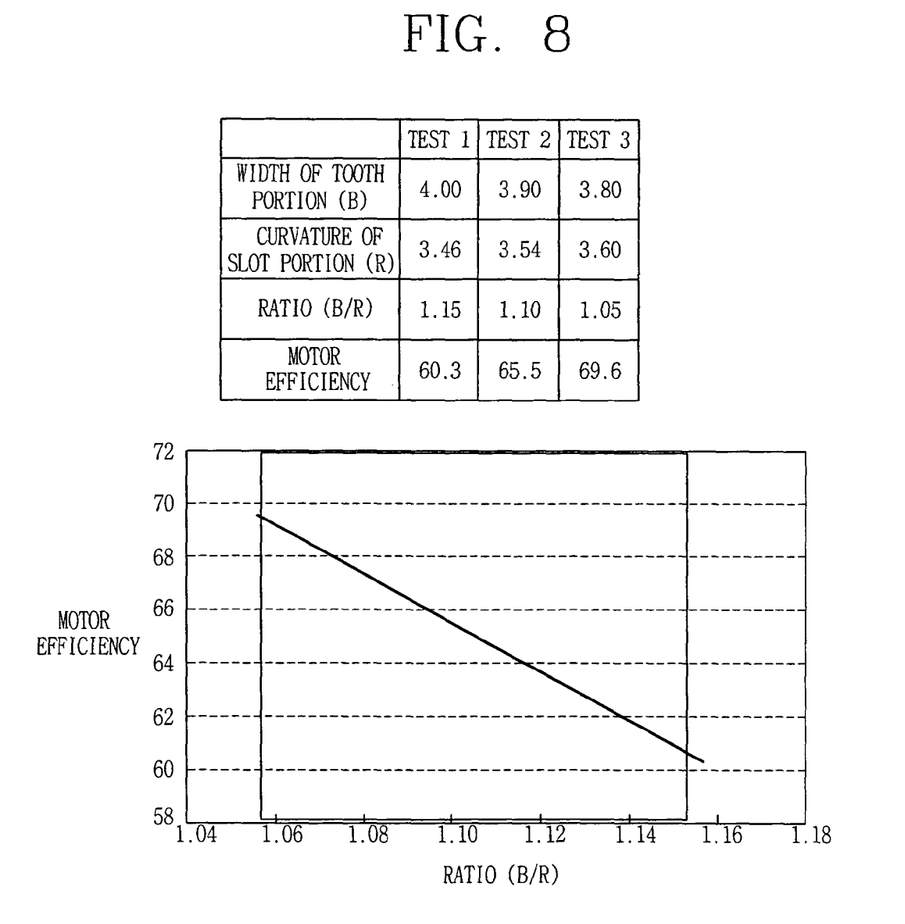
FIG. 8 is a table and a graph both showing testing results including a ratio between a coil and a gap between pole portions (a gap between teeth) and motor efficiency depending on the ratio, in the motor for the compressor shown in FIG. 1.

A ratio of the width B of each tooth portion 212 to a curvature R between neighboring tooth portions 212, namely, a ratio between the width B of the tooth portion 212 and the curvature R of the slot portion 213 to be explained later is in relation to the efficiency of the motor for the compressor. For example, as shown in FIG. 8, when the width B of the tooth portion 212 is 4.00 mm and the curvature R of the slot portion 213 is 3.46 mm (i.e., test 1), the ratio B/R of the width B of the tooth portion 212 to the curvature R of the slot portion 213 is 1.15, and the motor efficiency thereof is 60.3%. Also, when the width B of the tooth portion 212 is 3.90 mm and the curvature R of the slot portion 213 is 3.54 mm (i.e., test 2), the ratio B/R of the width B of the tooth portion 212 to the curvature R of the slot portion 213 is 1.10 and the motor efficiency thereof is 65.5%. When the width B of the tooth portion 212 is 3.80 mm and the curvature R of the slot portion 213 is 3.60 mm (i.e., test 3), the ratio B/R of the width B of the tooth portion 212 to the curvature R of the slot portion 213 is 1.05 and the motor efficiency thereof is 69.6%. So, it can be seen that the low ratio B/R of the width B of the tooth portion 212 to the curvature R of the slot portion 213 more increases the efficiency of the motor 200 for the compressor. Here, the ratio B/R is preferably in the range less than about 1.15. The curvature of the slot portion 213 can be configured such that a curvature of a main slot portion 213a to be explained later on which a main coil is wound has approximately the same to a curvature of a sub slot portion 213b to be explained later on which a sub coil is wound.

The slot portion 213, as shown in FIGS. 3 and 4, may include a plurality of main slot portions 213a on which a main coil is wound, and a plurality of sub slot portions 213b on which a sub coil is wound. The main slot portions 213a and the sub slot portions 213b are alternately formed in a circumferential direction with a certain gap therebetween. For example, as shown in FIG. 4, the plurality of main slot portions 213a are formed in the circumferential direction followed by the plurality of sub slot portions 213b formed with a 90° phase difference. Sequentially, the plurality of main slot portions 213a are formed with a 90° phase difference, followed by the plurality of sub slot portions 213b formed with a 90° phase difference.

A sectional area of each main slot portion 213a may be formed to be larger than that of each sub slot portion 213b. The sectional areas of the main slot portion 213a and the sub slot portion 213b may appropriately be determined depending on the number of turns of the coil with considering productivity of the motor. That is, for the main slot portions 213a, it may be preferable for the ratio N/S1 of the number of turns N of the coil in one slot portion to an individual slot portion 213a to be equal to or more than 2.18, more particularly, equal to or more than 2.20. For the sub slot portions 213b, it may be preferable for the ratio N/S2 to be equal to or more than 1.85.

Figure 9:
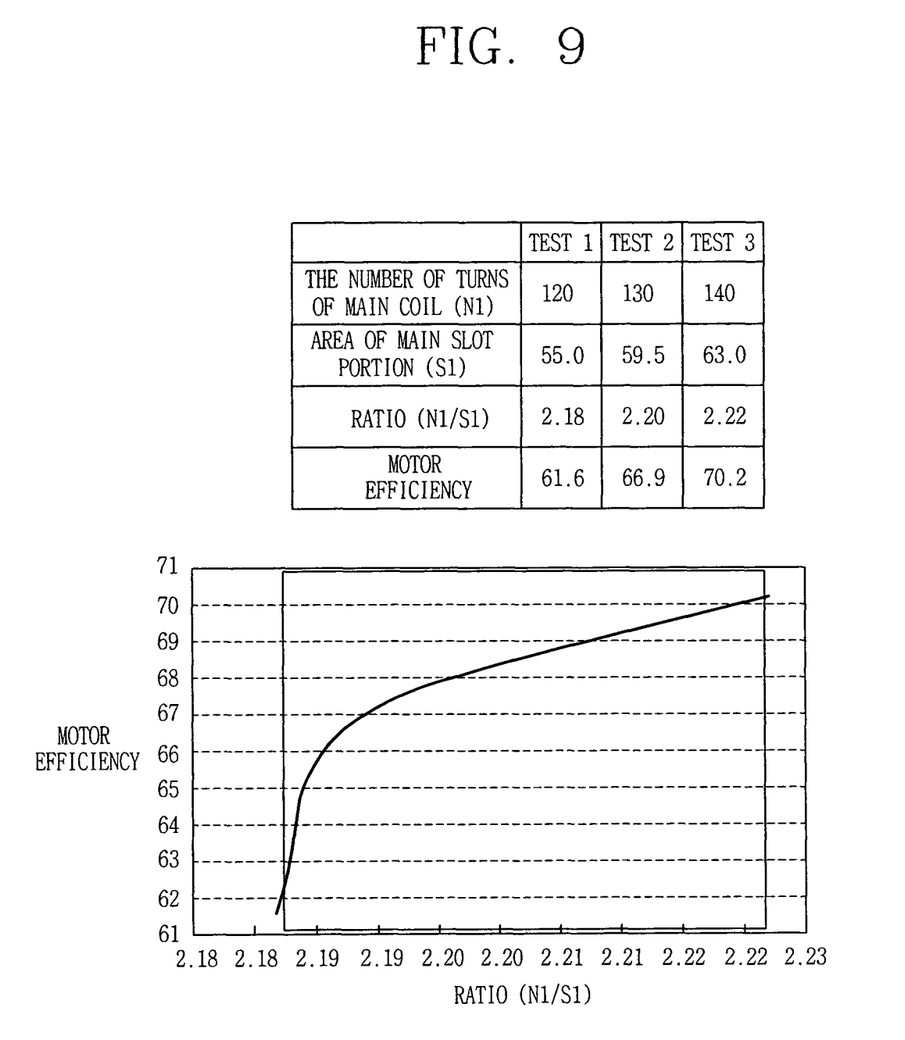
FIG. 9 is a table and a graph both showing testing results including a ratio between the number of turns and a sectional area of a main slot portion in the motor for the compressor shown in FIG. 1.

First, explaining the case of the main slot portions 213a in detail, for a 0.4~0.5 mm diameter of the coil, the appropriate sectional area of the main slot portion 213a may be 55 mm$^2$ for 120 turns of the coil, 59.5 mm$^2$ may be appropriate for 130 turns, and 63 mm$^2$ may be appropriate for 140 turns. That is, as shown in FIG. 9, for the main slot portions 213a, the efficiency of 61.6% is obtained in the motor for the compressor when a ratio N1/S1 of the number of turns N of the coil to the sectional area of the main slot portion S1 is 2.18 (i.e., test 1), the efficiency of 66.9% is obtained in the motor for the compressor when the ratio N1/S1 is 2.20 (i.e., test 2), and the efficiency of 70.2% is obtained in the motor for the compressor when the ratio N1/S1 is 2.22 (i.e., test 3). It can be seen that the efficiency of the motor for the compressor can be more improved in case of the higher ratio N1/S1 of the number of turns N of the coil to the sectional area S1 of each main slot portion. Hence, when the ratio N1/S1 of the number of turns N of the coil to the sectional area S1 of each main slot portion is 2.18, the efficiency of such motor is lower than an average efficiency of a typical motor (e.g., a single-phase induction motor) for a compressor having the copper coil. However, when the ratio N1/S1 is equal to or more than 2.20, it can be noticed that the efficiency of such motor is similar to or more improved than the average efficiency of the typical motor for the compressor. That is, even when employing the aluminum coil, if the ratio of the number of turns of the coil to the sectional area of the main slot portion is appropriately adjusted, the efficiency of the motor for the compressor cannot be decreased.

Figure 10:
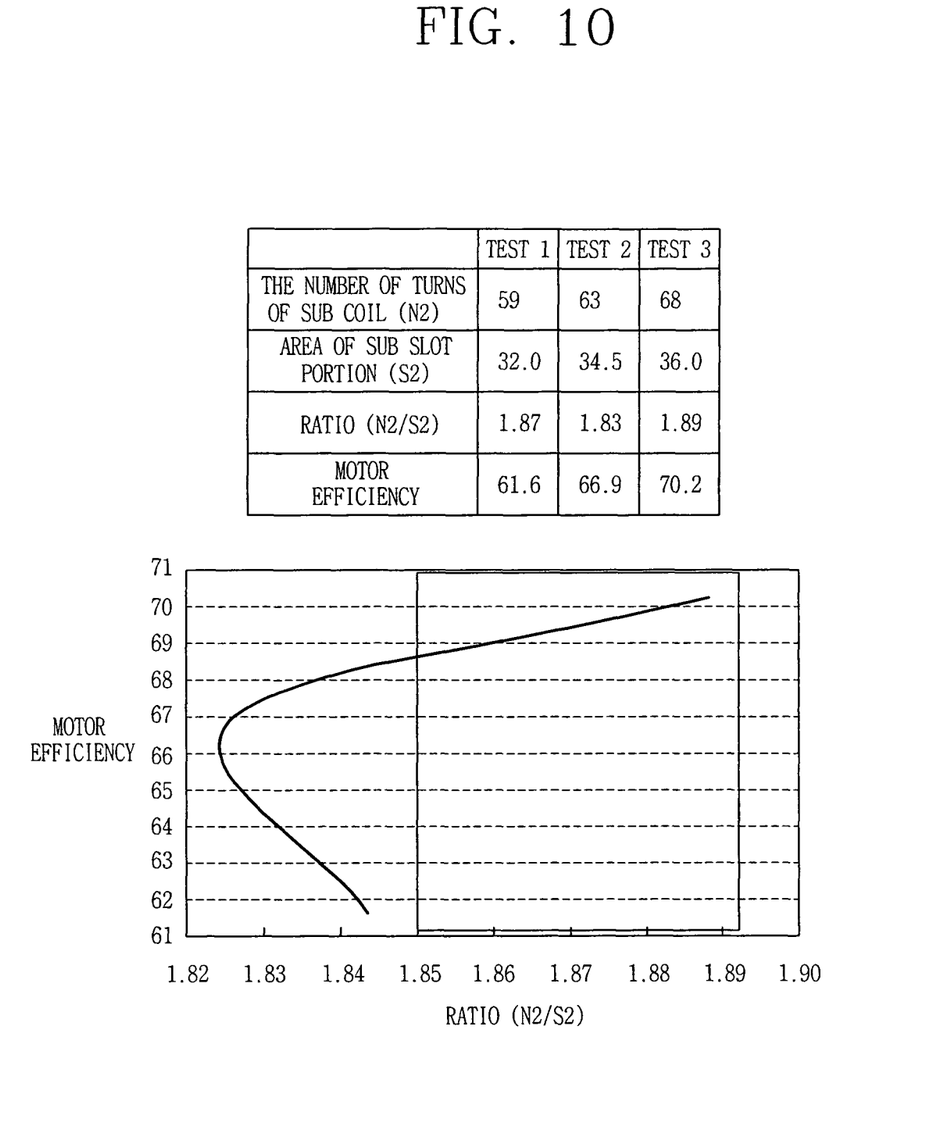
FIG. 10 is a table and a graph both showing testing results including a ratio between the number of turns and a sectional area of a sub slot portion in the motor for the compressor shown in FIG. 1.

Next, explaining the case of the sub slot portions 213b in detail, for a 0.4~0.5 mm diameter of the coil, the appropriate sectional area of the sub slot portion 213b may be 32 mm$^2$ for 59 turns of the coil, 34.5 mm$^2$ may be appropriate for 63 turns, and 36 mm$^2$ may be appropriate for 68 turns. That is, as shown in FIG. 10, it can be implemented for the sub slot portions 213b that the efficiency of 61.6% is obtained in the motor for the compressor when a ratio N2/S2 of the number of turns N2 of the coil to the sectional area S2 of the sub slot portion (i.e., test 1), the efficiency of 66.9% is obtained when the ratio N2/S2 is 1.83 (i.e., test 2), and 70.2% is obtained when the ratio N2/S2 is 1.89 (i.e., test 3). Although it is not quantitative, it can be understood that the efficiency of the motor is more improved when the ratio N2/S2 of the number of turns N2 of the coil to the sectional area S2 of the sub slot portion is higher. Hence, in order to improve the efficiency of the motor, preferably, the ratio N2/S2 of the number of turns N2 of the coil to the sectional area S2 of the sub slot portion should be equal to or more than 1.85.

Here, the sectional area of the main slot portion 213a and that of the sub slot portion 213b can equally be applied both when the main and sub slot portions 213a and 213b are all wound by the aluminum coil, and when the main slot portion 213a is wound by the copper coil and the sub slot portion 213b is wound by the aluminum coil.

The individual sectional area or entire sectional area and the number of the main slot portions 213a and the sub slot portions 213b can be configured to be the same to or different from each other. They can be designed by considering the efficiency compared with the price of coil wound in the motor. For example, in case of using only the aluminum coil for the coil 240, the individual sectional area or entire sectional area and the number of the main slot portions 213a and the sub slot portions 213b may be extended as compared to the copper coil, but their relative ratio therebetween may be configured not to be very different from the shape of a slot portion of a typical motor. However, in case of using the aluminum coil for the main slot portion 213a and the copper coil for the sub slot portion 213b, the diameter of the aluminum coil is extended longer than the diameter of the copper coil, and accordingly the individual sectional area or entire sectional area and the number of the main slot portions 213a may be relatively increased compared to those of the sub slot portions 213b. In contrast, in case of using the copper coil for the main slot portion 213a and the aluminum coil for the sub slot portions 213b, the individual sectional area or entire sectional area and the number of the sub slot portions 213b may be relatively increased compared to those of the main slot portions 213a.

The coil 240 wound on the stator 210 may be made of aluminum (having 62.7% of conductivity), which has the conductivity lower than copper (having 99.9% of conductivity) but not very lower than that, and particularly has a price much cheaper than the copper.

The aluminum coil has lower conductivity than the copper, resulting in a chance of lowering the efficiency of the motor 200 for the compressor. Thus, in order to compensate this, preferably, the diameter of the aluminum coil may be about 25% thicker than the diameter of the copper coil.

For the aluminum coil, since the aluminum has lower rigidity than the copper in its material characteristic, in order to maintain the rigidity of the coil, a thickness of an enamel layer coated on an outer circumferential surface of the aluminum coil coated with an insulating material should be thicker than at least an enamel layer coated on the outer circumferential surface of the copper coil.

For the aluminum coil, since the aluminum has lower rigidity than the copper in its material characteristic, a damping effect may be deteriorated. Accordingly, noise may increase at a specific lower frequency band. However, such problem can be solved by optimizing an inner diameter D of the stator 210 and an area S of the slot portion 213 or solved by optimizing the inner diameter D of the stator 210 and heights of upper and lower end coils 241 and 242.

Figure 11:
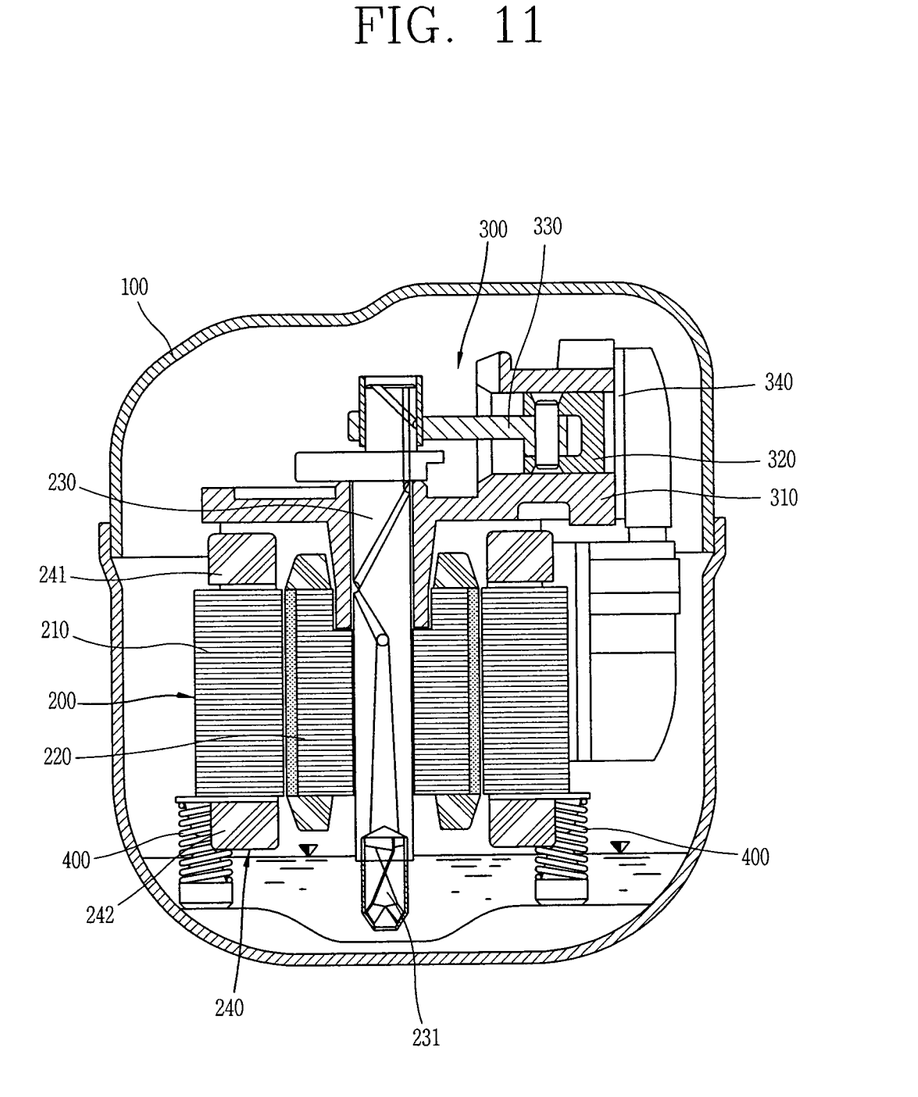
FIG. 11 is a longitudinal cross-sectional view showing a reciprocating compressor having the motor for the compressor shown in FIG. 1.

Hereinafter, a reciprocating compressor having a reciprocating motor according to the above embodiment will be described with reference to FIG. 11.

That is, the reciprocating compressor according to the present invention may include a hermetic case 100, a driving motor 200 serving as a driving source installed in the hermetic case 100, a compression unit 300 configured such that a piston 320 is connected to a rotational shaft 230 of the driving motor 200 via a connecting rod 330 to linearly reciprocate in a compression space of a cylinder block 310 having a valve assembly 340, thus to compress a refrigerant, and a supporting unit 400 installed between a bottom surface of the hermetic case 100 and a lower surface of the driving motor 200 for elastically supporting the driving motor 200 and the compression unit 300.

The driving motor 200 may be implemented as the aforesaid motor for the compressor, namely, an induction motor in which the aluminum coil is inserted in both the main and sub slot portions 213a and 213b of the stator 210 to be wound on the tooth portions 212, or the copper coil is inserted in the main slot portions 213a and the aluminum coil is inserted in the sub slot portions 213b or vice versa so as to be wound on the corresponding tooth portions 212. The driving motor 200 has the same configuration of its stator 210 as described above for the reciprocating motor, detailed description of which will thusly be omitted.

However, in the driving motor 200, when the diameter of the aluminum coil is formed longer than the copper coil in order to maintain the efficiency of the motor, the weight of the stator 210 is increased and also the heights of the upper and lower end coils 241 and 242 of the stator 210 are increased. Accordingly, an installation position of the compression unit 300 and the height of the hermetic case 100 should be raised by considering an interfere with the compression unit 300. It is also required to increase an elastic force in a longitudinal direction of the supporting unit 400 as much as the increased weight of the stator 210. To this end, it may be possible to decrease a height of a compression coil spring configuring the supporting unit 400. However, in this case, it should be considered that an oil feeder installed at a lower end of the rotational shaft 230 of the driving motor 200 should not bump against the hermetic case 100. By concerning the increase in the weight of the stator 100 and the height of the compression unit 300, the weight of an eccentric mass installed at the rotor 220 or the rotational shaft 230 should appropriately be adjusted, in order to prevent noise occurred due to a friction between the stator 210 and the rotor 220 of the driving motor 200.

In the reciprocating compressor according to the embodiment of the present invention, when power is supplied to the driving motor 200, the rotational shaft 230 rotates and the rotational force is converted into a linear reciprocating motion of the compression unit 300 by the connecting rod 330 so as to be transferred. Also, in the compression unit 300, a series of processes are repeated, namely, the piston 320 sucks a refrigerant via the valve assembly 340 while linearly reciprocating in the compression space of the cylinder block 310, so as to compress the refrigerant, and then discharges the compressed refrigerant to a refrigerating system.

Here, in the driving motor 200, when an alternating current is applied from the exterior to a main coil and a sub coil wound on the stator 210, a force is applied that the sub coil, which has a pole axis electrically prior to the main coil by 90°, is primarily rotated due to the formation of a rotation magnetic field by the current. Also, the sub coil has a current phase which is prior to the main coil due to a capacitor serially connected thereto. Accordingly, the driving motor 200 rotates at high speed. While the driving motor 200 rotates at the high speed, the rotational force is converted into a linear motion via the connecting rod 330, to be transferred to the piston 320.

As such, by employing the driving motor with the aluminum coil wound therein, a material cost of the driving motor can be reduced so as to drastically decrease a fabricating cost without a great change in the efficiency of the reciprocating compressor as compared to a motor having the copper coil wound therein. Also, the efficiency of the reciprocating compressor can be improved from the perspective of its price by appropriately designing an individual sectional area, an entire sectional area or the number of main and sub slot portions.

The motor for the compressor according to the present invention can be applied to other compressors as well as the reciprocating compressor. However, standards for each component may be different for each compressor.

[Pretext]

Motor for compressor, stator, aluminum coil

The invention claimed is:

1. A motor for a compressor, comprising:
   a stator provided with a yoke portion formed in an annular shape to configure a passage through which magnetism flows, a plurality of tooth portions that protrudes from an inner circumferential surface of the yoke portion toward a center thereof by a certain length in a circumferential direction, and a plurality of slot portions recessed between the tooth portions as deep as configuring a certain sectional area in a circumferential direction;
   a plurality of coils wound on the plurality of slot portions and the plurality of tooth portions of the stator, at least some of the plurality of coils being formed of aluminum;
   a rotor inserted in the stator with a certain gap therebetween and having conductors therein which are rotated by an electromagnetic induction of the plurality of coils; and
   a rotational shaft press-fitted in a center of the rotor to transfer a rotational force to a compression device,
   wherein an area of an open side of each slot portion is not smaller than at least a diameter of the coil, and wherein a ratio d/A of the diameter d of the coil to the area A of the open side of the slot portion is:
   more than approximately 0.29 for 20 slot portions;
   more than approximately 0.24 for 24 slot portions; and
   more than approximately 0.25 for 28 slot portions.

2. The motor of claim 1, wherein the area A of the open side of the slot portion is formed to be, when the diameter of the coil is 0.5 mm:
   less than approximately 1.73 mm for 20 slot portions;
   less than approximately 2.10 mm for 24 slot portions; and
   less than approximately 2.00 mm for 28 slot portions.

3. A motor for a compressor, comprising:
   a stator provided with a yoke portion formed in an annular shape to configure a passage through which magnetism flows, a plurality of tooth portions that protrudes from an inner circumferential surface of the yoke portion toward a center thereof by a certain length in a circumferential direction, and a plurality of slot portions recessed between the tooth portions as deep as configuring a certain sectional area in a circumferential direction;
   a plurality of coils wound on the plurality of slot portions and the plurality of tooth portions of the stator, at least some of the plurality of coils being formed of aluminum;
   a rotor inserted in the stator with a certain gap therebetween and having conductors therein which are rotated by an electromagnetic induction of the plurality of coils; and
   a rotational shaft press-fitted in a center of the rotor to transfer a rotational force to a compression device,
   wherein the slot portion has an outer surface formed to be curved with a particular curvature, wherein the curvature of the outer surface of the slot portion being increased when a width of the tooth portion is decreased, and wherein a ratio B/R of a width B of the tooth portion to a curvature R of the slot portion is less than approximately 1.15.

4. The motor of claim 3, wherein the slot portion is configured such main slot portions wound by a main coil and sub slot portions wound by a sub coil are alternately arranged, and curvatures of the main and sub slot portions are approximately the same.

5. A motor for a compressor, comprising:
   a stator provided with a yoke portion formed in an annular shape to configure a passage through which magnetism flows, a plurality of tooth portions that protrudes from an inner circumferential surface of the yoke portion toward a center thereof by a certain length in a circumferential direction, and a plurality of slot portions recessed between the tooth portions as deep as configuring a certain sectional area in a circumferential direction;
   a plurality of coils wound on the plurality of slot portions and the plurality of tooth portions of the stator, at least some of the plurality of coils being formed of aluminum;
   a rotor inserted in the stator with a certain gap therebetween and having conductors therein which are rotated by an electromagnetic induction of the plurality of coils; and
   a rotational shaft press-fitted in a center of the rotor to transfer a rotational force to a compression device,
   wherein a ratio N/S of a number of turns N of the coil wound at one slot portion to a sectional area S of the individual slot portion is equal to or more than 2.20.

6. The motor of claim 5, wherein when a diameter of the coil is 0.4~0.5 mm, the number of turns of the coil is in the range of 120 to 140 and the sectional area of the slot portion is in the range of 55.0 $mm^2$~63.0 $mm^2$.

7. The motor of claim 5, wherein the slot portion is configured such that two slot portion groups having different sectional areas are alternately arranged, and a ratio N/S of the number of turns N of the coil wound at a slot portion group having a relatively great sectional area to a sectional area S of the individual slot portion is equal to or more than 2.20.

8. A motor for a compressor, comprising:
   a stator provided with a yoke portion formed in an annular shape to configure a passage through which magnetism flows, a plurality of tooth portions that protrudes from an inner circumferential surface of the yoke portion toward a center thereof by a certain length in a circumferential direction, and a plurality of slot portions recessed between the tooth portions as deep as configuring a certain sectional area in a circumferential direction;
   a plurality of coils wound on the plurality of slot portions and the plurality of tooth portions of the stator, at least some of the plurality of coils being formed of aluminum;
   a rotor inserted in the stator with a certain gap therebetween and having conductors therein which are rotated by an electromagnetic induction of the plurality of coils; and
   a rotational shaft press-fitted in a center of the rotor to transfer a rotational force to a compression device,
   wherein a ratio N/S of a number of turns N of the coil inserted in one slot portion to a sectional area S of the individual slot portion is equal to or more than 1.85.

9. The motor of claim 8, wherein when a diameter of the coil is 0.4~0.5 mm, the number of turns of the coil is in the range of 59~68, and the sectional area of the slot portion is in the range of 32.0 $mm^2$~36.0 $mm^2$.

10. The motor of claim 8, wherein the slot portion is configured such that two slot portion groups having different sectional areas are alternately arranged, and a ratio N/S of the number of turns N of the coil wound on a slot portion group having a relatively small sectional area to a sectional area S of each slot portion is equal to or more than 1.85.

11. The motor of claim 1, wherein a width of the tooth portion is not smaller than at least the diameter of the coil.

12. The motor of claim 1, wherein the slot portion is provided with main slot portions wound by a main coil and sub slot portions wound by a sub coil, the main and sub slot portions have different sectional areas, and several numbers of main slot portions and sub slot portions are alternately arranged.

13. The motor of claim 12, wherein at least one of the coils wound at the main slot portions and the sub slot portions is an aluminum coil, and another one is a coil having a higher conductivity than the aluminum coil.

14. The motor of claim 13, wherein a coil formed of copper is wound at slot portions which are not wound by the aluminum coil.

15. The motor of claim 1, wherein the slot portion is provided with main slot portions wound by a main coil and sub slot portions wound by a sub coil, wherein the main and sub slot portions have the same sectional area, and wherein several numbers of main slot portions and sub slot portions are alternately arranged.

16. The motor of claim 15, wherein at least one of the coils wound at the main slot portions and the sub slot portions is an aluminum coil, and another one is a coil having a higher conductivity than the aluminum coil.

17. The motor of claim 16, wherein a coil formed of copper is wound at slot portions which are not wound by the aluminum coil.

18. A hermetic compressor, comprising:
a hermetic case;
a driving motor installed in the hermetic case that generates a rotational force; and
a compression device installed in the hermetic case and driven by the driving motor to compress a refrigerant, wherein the driving motor comprises:
a stator provided with a yoke portion formed in an annular shape to configure a passage through which magnetism flows, a plurality of tooth portions that protrudes from an inner circumferential surface of the yoke portion toward a center thereof by a certain length in a circumferential direction, and a plurality of slot portions recessed between the tooth portions as deep as configuring a certain sectional area in a circumferential direction;
a plurality of coils wound on the plurality of slot portions and the plurality of tooth portions of the stator, at least some of the plurality of coils being formed of aluminum;
a rotor inserted in the stator with a certain gap therebetween and having conductors therein which are rotated by an electromagnetic induction of the plurality of coils; and
a rotational shaft press-fitted in a center of the rotor to transfer a rotational force to a compression device, wherein an area of an open side of each slot portion is not smaller than at least a diameter of the coil, and wherein a ratio d/A of the diameter d of the coil to the area A of the open side of the slot portion is:
more than approximately 0.29 for 20 slot portions;
more than approximately 0.24 for 24 slot portions; and
more than approximately 0.25 for 28 slot portions.

19. The compressor of claim 18, wherein the compression device comprises:
a cylinder block installed in the hermetic case that forms a compression space;
a connecting rod having one end coupled to a rotational shaft of the driving motor to convert a rotating motion into a linear motion;
a piston coupled to another end of the connecting rod and linearly moving in the compression space of the cylinder block so as to compress a refrigerant; and
a valve assembly coupled to the cylinder block that controls suction and discharge of a refrigerant.

* * * * *